Feb. 21, 1933.   A. J. LE MAY   1,898,016
ALTERNATING CURRENT CIRCUIT
Filed Feb. 12, 1931
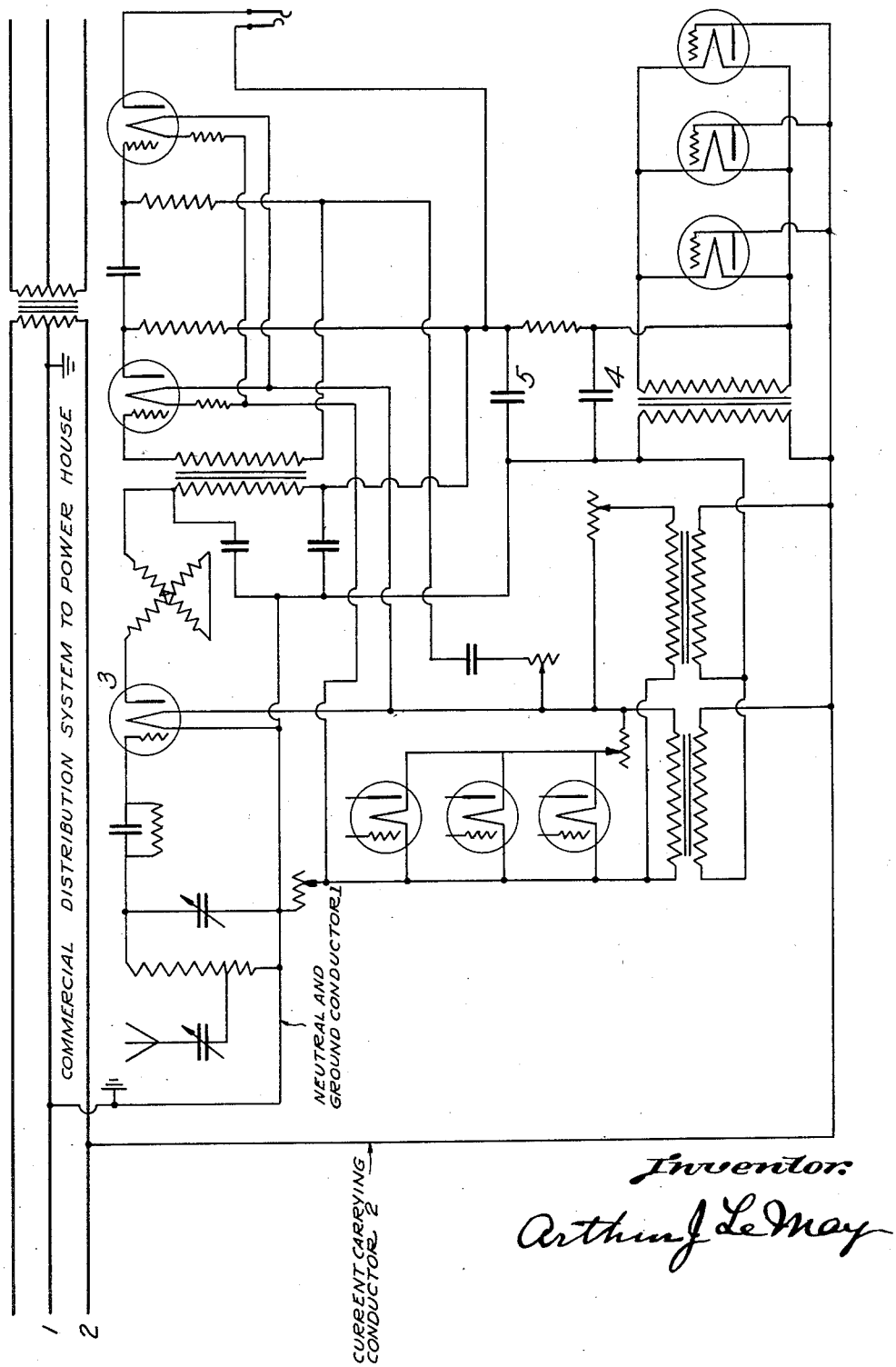
Inventor:
Arthur J LeMay Patented Feb. 21, 1933

1,898,016

UNITED STATES PATENT OFFICE

ARTHUR J. LE MAY, OF BROOKLYN, NEW YORK

ALTERNATING CURRENT CIRCUIT

Application filed February 12, 1931. Serial No. 515,316.

This application is a continuation in part of my prior application, Serial No. 149,686 filed November 20, 1926.

This invention relates broadly to a commercial distribution system of electricity, wherein is employed a conductor of an alternating current and an associated conductor which is neutral and grounded.

An object of the invention is to employ said conductors as electrical potential sources to circuits for detection and audio amplification of radio signals, to circuits for television, to circuits for sound reproducing, to circuits for telegraph or telephone systems, and to any other circuits wherein such electrical potentials may be utilized with advantages.

Another object of the invention is to provide means for operation of the aforesaid circuits during the negative alternation of the alternator which supply the alternating current to said commercial system.

In as much that in modern commercial distribution system of alternating current, use is made of a current carrying conductor and an associated conductor which is neutral and grounded, and that said neutral conductor is again grounded at or near the electrical meter in each building, the advantages of the employment of said commercial distribution system as potentials to a utilization circuit will be readily apparent to one skilled in the art.

Heretofore the conductors of the commercial distribution system of alternating current have not been used as potentials for sound reproducing devices or the like, due to the reversal of the direction of the flow of the current, and also due to the noises caused by the armature windings and the brushes of the alternator which produces the alternating current, and also due to noises caused by other devices connected to said conductors.

The novel features which I believe to be characteristic of my invention are set forth in the appended claim. It will be understood that the principles of my invention may be embodied in various forms, and that the details are not material, and as an example the invention is shown with a utilization circuit consisting of circuits for the detection and audio amplification of radio signals. My invention itself will be best understood by reference to the following description and a study of the drawing, in which, it will be seen that the neutral and grounded conductor 1 of the commercial distribution system is connected to a plurality of elements of the tube 3 thereby supplying a grounded and negative potential to the circuit. It will be seen that the current carrying conductor 2 of the commercial distribution system is connected to the plate circuit, thereby supplying a positive potential and charging the condensers 4 and 5 with a momentary current. The condensers 4 and 5 which may be of six microfarads capacity are connected between the positive potential and the neutral and grounded conductor of the commercial distribution system and are a path for the noises of the armature winding and the brushes of the alternator which supply the alternating current to the commercial distribution system, and become positive potentials to the circuit during the negative alternation of the alternator. Assuming an instant that the conductor 2 is positive to the plate circuit the direction of the flow of the current will be from conductor 2 towards the condensers 4 and 5 charging said condensers with a momentary current continuing its flow to the plates of the tubes, through the space path of said tubes to the neutral and grounded conductor. Assuming at another instant, that the conductor 2 is negative to the plates the condensers 4 and 5 now become positive and release the momentary current which will flow towards the plates of the tubes through the space paths of said tubes to the neutral and grounded conductor. The above process repeats itself as long as the electromotive force is applied to the circuit.

While I have described an embodiment of the invention it should be understood that I reserve the right to make such changes in the form, construction and arrangements of parts, as will not depart from the spirit of the invention or the scope of the subjoined claim.

What I claim as new and desire to secure by Letters Patent of the United States is:

In a commercial distribution system for alternating current comprising a power transformer having primary and secondary windings, a plurality of distribution circuits connected to and extending from the transformer secondary, said distribution circuits having a common neutral conductor grounded at the power transformer, service lines extending from each one of the distribution circuits, the combination of a radio receiving system energized from said distribution system, means for energizing the power circuits of the radio receiving system from one of said service lines, means for grounding said service line at or near a point of connection to the power circuits of the radio receiving system, whereby disturbing effects produced in the other service lines of the distribution system will be minimized in the first-mentioned service line, and means for connecting the cathode circuit of the radio receiving system to the grounded conductor of said service line.

ARTHUR J. LE MAY.